June 8, 1965  H. N. STEPHAN  3,187,609
COMBINED HORIZONTAL BORING, DRILLING AND MILLING MACHINE
Filed Aug. 12, 1964  3 Sheets-Sheet 1
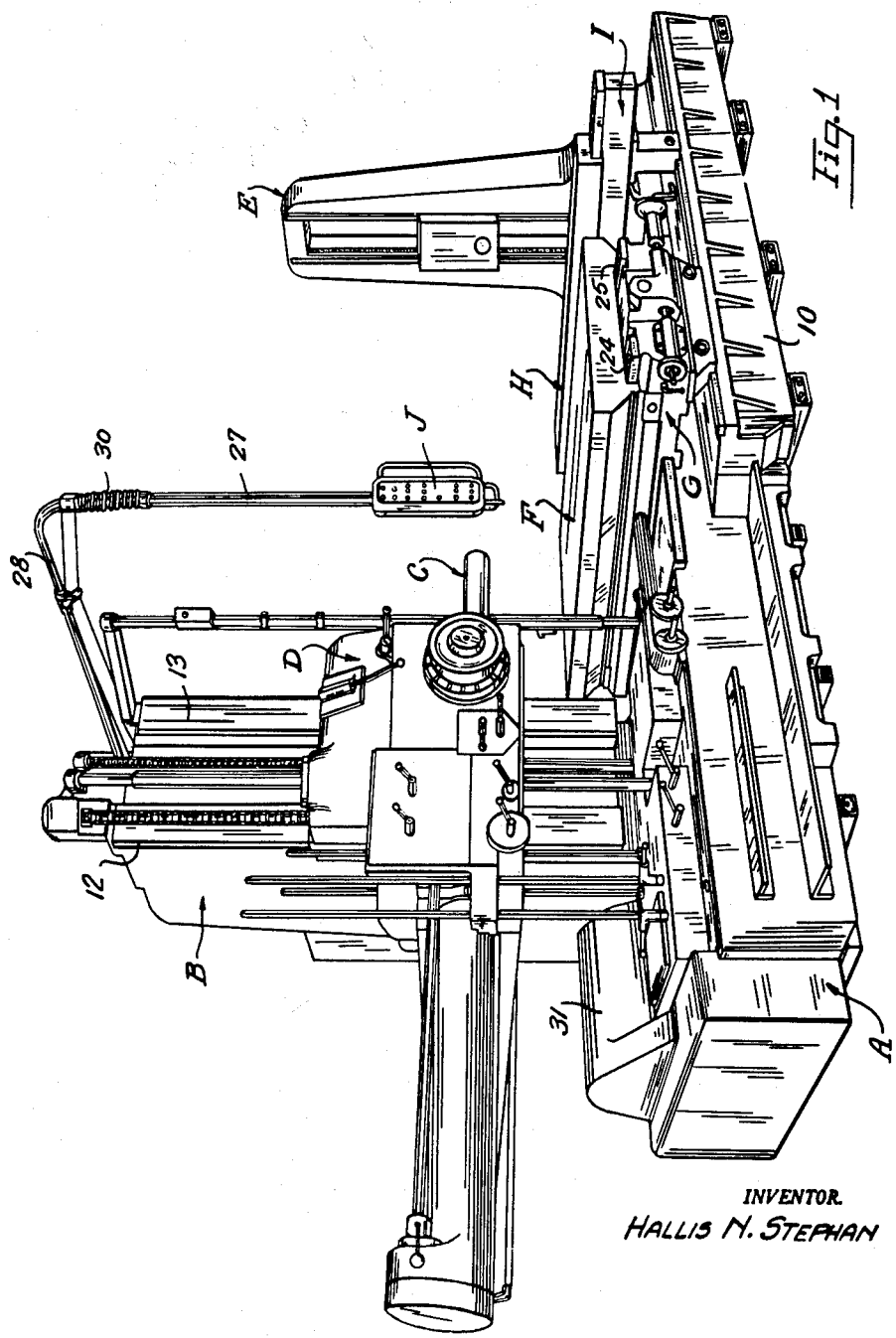
INVENTOR.
HALLIS N. STEPHAN

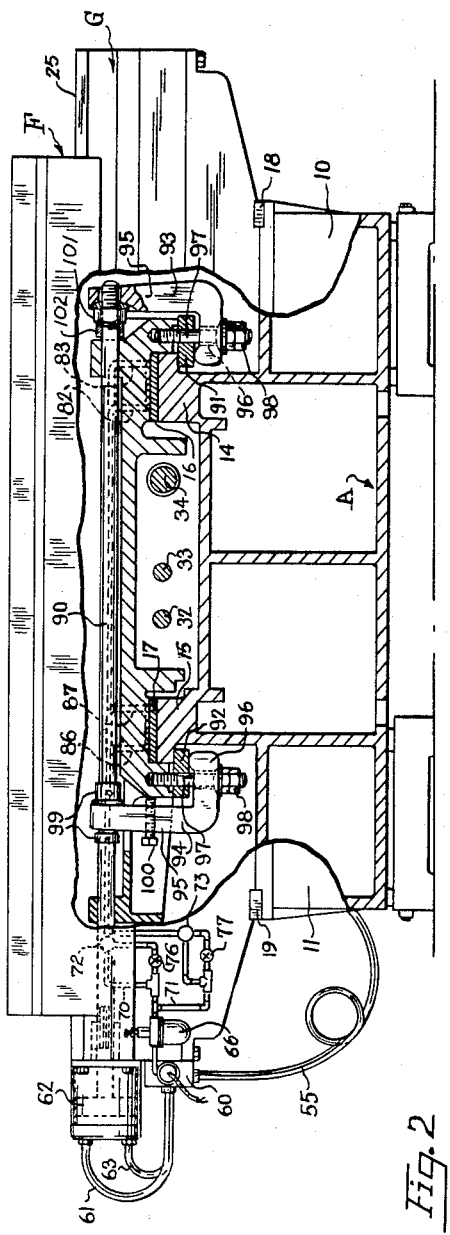

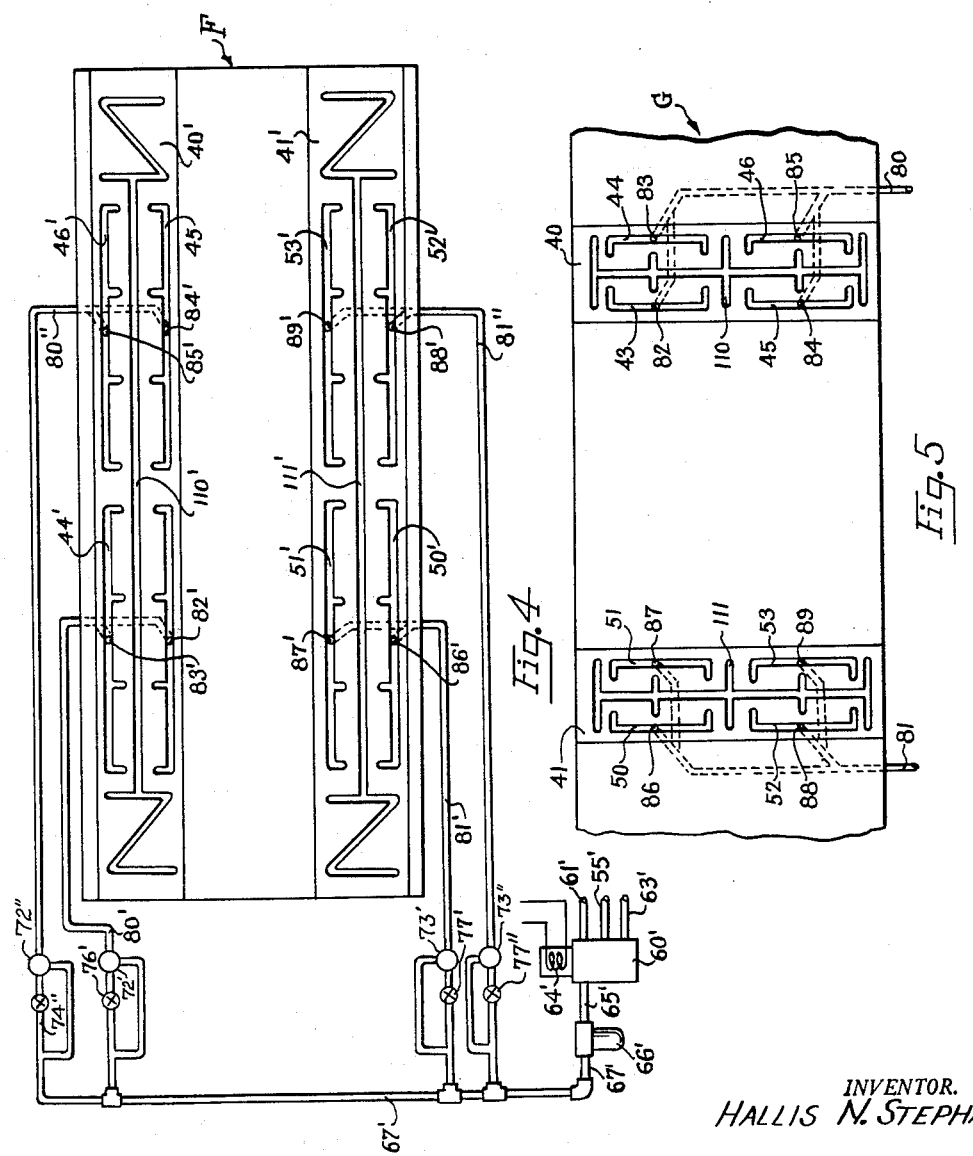

000# United States Patent Office 3,187,609
Patented June 8, 1965

3,187,609
COMBINED HORIZONTAL BORING, DRILLING AND MILLING MACHINE
Hallis N. Stephan, Shaker Heights, Ohio, assignor to The New Britain Machine Company, New Britain, Conn., a corporation of Connecticut
Filed Aug. 12, 1964, Ser. No. 389,102
10 Claims. (Cl. 77—3)

The present invention relates to machine tools, and, more particularly, to boring, drilling and milling machines the movable slides of which are relatively heavy.

The benefit of 35 U.S.C. 120 is claimed for this application which is a continuation-in-part of now abandoned U.S. applications Serial No. 656,894 filed May 3, 1957, and Serial No. 833,180 filed August 12, 1959. The disclosures of the aforementioned applications, including the specifications and drawings thereof are incorporated herein by reference.

In horizontal boring, drilling and milling machines, much of the cutting or working operation is performed by a boring tool carried upon the projecting end of a rotatable, horizontal tool spindle or boring bar supported in a spindle head and reciprocable lengthwise therein. The spindle head is, in turn, supported for vertical movement along a column with the projecting end of the tool spindle overlying a work table or first slide supported for movement longitudinally or transversely of the axis of the tool spindle upon a saddle or second slide movable upon the bed of the machine transversely of the movement of the work table. The first slide or table is slidably supported upon upwardly facing, horizontal ways formed on the top of the second slide or saddle which in turn is supported in a similar manner upon horizontal ways formed on the top of the bed.

In machines of the character referred to as well as in other types of machines comprising a machine slide supported upon ways and particularly a relatively heavy machine slide supported upon horizontal ways, it is difficult to accurately position the movable machine slide in a predetermined desired location on its support because of the inertia of the slide and its tendency to stick to the slide supporting ways partly due to the fact that the oil drains or is squeezed from between the way surfaces especially when the machine is at rest leaving a metal to metal contact between the ways.

One of the important objects of the present invention is the provision of a new and improved method of reducing the friction between a relatively heavy slide member and its support, such as the table or saddle of a combined horizontal boring, drilling and milling machine and the ways upon which it is supported, which method comprises introducing air or other gaseous fluid, preferably air having small particles of oil therein between the member and the surface or surfaces upon which it is slidably supported to uniformly lift the element a minute amount or to relieve at least a part of the weight of the member during the period that it is moving.

Another object of the present invention is the provision of a new and improved combined horizontal boring, drilling and milling machine, or the like, including a movable machine tool element, such as a saddle or table, having way surfaces on its underside which cooperate with the way surfaces on the upper side of the member upon which it is slidably supported and a lubricating system for the ways effective to continuously supply under pressure and in a predetermined pattern a predetermined amount of gaseous fluid preferably air, between the ways while the element is being moved, to separate the ways a predetermined small amount or relieve them of at least part of the weight of the element.

Another object of the present invention is the provision of a new and improved combined horizontal, boring, drilling and milling machine having a movable machine tool element, such as a table or saddle, supported for movement by ways on the supporting member, a lubricating system of the character referred to above, and clamping mechanism for selectively clamping the element to its support, the machine preferably being so constructed and arranged that the element is automatically unclamped while fluid is being supplied to the ways and upon the termination of the supply of fluid is automatically clamped against movement.

The invention resides in certain constructions, combinations and arrangements of parts and further objects and advantages will be apparent to those skilled in the art to which it relates from the following description of the preferred embodiment described with reference to the accompanying drawings forming a part of this specification and in which:

FIG. 1 is a perspective view of a combined horizontal boring, drilling and milling machine embodying the present invention;

FIG. 2 is a cross-sectional view through the bed of the machine immediately to the left of the saddle as viewed in FIG. 1, with parts broken away;

FIG. 3 is a diagrammatic view showing the apparatus for supplying the lubricant to the saddle ways and the electric circuits for controlling the clamping and unclamping of the saddle, etc.;

FIG. 4 is a fragmentary bottom plan view of the saddle showing the way surfaces on its underside; and FIG. 5 is a fragmentary bottom plan view of the table showing the way surfaces on its underside and diagrammatically, the apparatus for supplying the lubricant thereto, and the electric circuits for controlling the ways, clamps, etc.

While the invention is susceptible of various modifications and alternative constructions and of being embodied in various machines and machine tools, it is herein shown and described as embodied in a horizontal boring, drilling and milling machine similar to that shown in U.S. Patent No. 2,339,435, issued January 18, 1944, wherein it is particularly useful in facilitating the accurate positioning of the heavy saddle and table. Since the machine shown is similar to that described in detail in the aforesaid patent, only those parts of the machine which are necessary to an understanding of the present invention are herein shown and described in detail.

Referring to the drawings, the illustrated machine includes a first member comprising a bed or base A provided with a spindle head column B adjacent to one end thereof and including horizontal lateral extensions or projections 10, 11 at opposite sides thereof formed integrally therewith and extending from the right-hand end of the machine as viewed in FIG. 1 to a point adjacent to the spindle head column. The extensions 10, 11 of the bed are approximately half the height of the bed proper. The tool spindle C is supported for rotation about a horizontal axis in a spindle head D slidably supported by means including vertical ways 12, 13 for vertical movement along the front face of the spindle head column B.

An outboard or backrest support column E is located adjacent to the opposite end of the bed A and is slidably supported for linear movement toward and from the spindle head column B upon upwardly facing, horizontal main saddle supporting ways 14, 15 including hardened steel strips 16, 17 on the upper or top side of the bed A and extending longitudinally thereof from the right-hand end of the machine approximately to the spindle head column B. A second member comprising a saddle G is located intermediate the spindle head column B and the backrest column E. The saddle G is movable between the spindle head column B and the backrest column E along the main saddle supporting ways 14, 15 and auxiliary saddle supporting ways 18, 19 on the top side of extensions 10, 11 on the main section of the bed and extending substantially coextensive in length therewith except for the left-hand end of the front extension 10 which is shortened to facilitate movement of the operator. The work is adapted to be supported upon a third member comprising a table F, which table is, in turn, slidably supported for movement transversely of the axis of the spindle upon table supporting ways 24, 25 on the top of the saddle G. In addition to the main table F, the machine shown includes an auxiliary table H slidably supported for movement transversely of the length of the spindle upon an auxiliary saddle I supported and movable on the bed A in a manner similar to that in which the main saddle G is supported and movable thereon.

In the machine shown, the different movements of the various machine elements, such as the rotation and reciprocation of the spindle C, and the reciprocation of the spindle head D, saddles G and I, tables F and H, etc., may be effected by power controlled from a pendant controlled station J fixed to the lower end of a tube 27 connected to a universally movable arm 28 by a flexible tube or conduit 30. Various rates of feed and spindle speeds can be selected by the various levers on the spindle head D, etc. With the exception of the extensions 10 and 11 of the bed A and the construction of the saddle supporting ways 14, 15, 18, 19 and the table supporting ways 24, 25, the machine shown is similar to that disclosed in the aforesaid patent to which reference is made for a complete description thereof.

While the means for moving the spindle head, backrest block, saddle and table are not herein shown and described in detail, machines of the character referred to are well known in the art and reference to the aforesaid patent will show that feed movements are imparted to the various machine tool elements by an electric motor housed within the cover 31 and operatively connected to screws which move the spindle head and backrest block, saddle and table respectively, by a feed change transmission of the gear type and a plurality of shafts, including splined shafts 32, 33, extending from the spindle head column B to the right-hand end of the machine. The screw for moving the saddle appears in FIG. 2 and is designated by the reference numeral 34. The feed motor may be selectively connected to the spindle head and backrest block screws or the saddle screw 34 or the table screw in a manner disclosed in the aforesaid patent.

As is well known to those skilled in the art to which the invention relates, the drives between the electric motors and relatively heavy machine tool elements moved thereby are difficult to control to accurately position the work in a predetermined desired location or position with respect to the tool. According to the present invention, the ways for movably supporting the saddle and table on the bed and saddle respectively are lubricated by air or an oil mist comprised of atomized oil particles entrained or suspended in air introduced and distributed therebetween at sufficient pressure and at a controlled rate to cause a slight lifting of the saddle from the bed and/or the table from the saddle to reduce the amount of friction therebetween.

The underside of the saddle G is provided with way surfaces 40, 41 which cooperate with the upper surfaces of the ways 14, 15, respectively of the bed to slidably support the saddle on the bed. The way surface 40 is provided with two pairs of grooves 43, 44 and 45, 46, extending in the direction of travel of the saddle. The pairs of grooves are located at opposite sides of the center of the way surface referring to the direction of travel of the saddle, and they terminate short of the ends of the way surface. The way surface 41 is provided with similar pairs of grooves 50, 51, 52, 53.

In the embodiment of the invention shown, air is supplied to the saddle at substantially constant pressure and uniform temperature by a conduit 55 connected to a suitable source of air pressure, such as, the substantial uniform temperature constant pressure air supply available in all shops where air tools are used. The conduit 55 is connected to a two-position solenoid valve 60, normally spring-biased to a first position in which position the air supply conduit 55 is connected to a conduit 61 leading to one side of a reversible fluid pressure actuated rotary motor 62 for operating the saddle clamps. The other side of the motor 62 is connected by a conduit 63 and the valve 60 with exhaust. When the solenoid 64 of the valve 60 is energized the direction of flow of fluid pressure through the valve 60 to the motor 62 is reversed thereby reversing the direction of rotation of the motor to release the saddle clamp. When the valve is in this position the supply conduit 55 is connected by a conduit 65 and an oil line lubricator 66, of commercial construction, to a conduit 67 terminating in two branch conduits 70, 71, which branch conduits are connected through two adjustable automatic compensating flow controllers including pressure regulators 72, 73 and adjustable needle valves 76, 77, to conduits 80, 81 terminating in bores or apertures 82, 83, 84, 85 in the saddle communicating with the grooves 43, 44, 45, 46 in the way surface 40 and bores or apertures 86, 87, 88, 89 communicating with the grooves 50, 51, 52, 53 in the way surface 41. The pressure regulators 72, 73 may be Model 63 BU Regulators manufactured for many years prior to May 1957 by Moore Products Company, Philadelphia, Pa., and when properly connected the needle valves 76, 77 constitute adjustable automatic compensating flow controllers or regulators which automatically maintain a constant mass flow rate of air in the conduits leading to the grooves in the ways 40, 41 under all downstream operating conditions. Alternately any suitable automatic flow control apparatus which will maintain a constant mass flow in the case of gaseous fluids may be employed, for example, the gaseous fluid flow control apparatus shown in United States patents to Bryant, No. 2,650,607 and Comeau, No. 2,662,547.

As is best shown in FIG. 2, the clamping mechanism comprises a shaft 90 rotatably supported by the saddle G and extending transversely thereof within the saddle and having its left-hand end, as the shaft is viewed in FIG. 2, connected to the rotor shaft of the air motor 62 by a splined connection. The clamping mechanism is substantially the same as that shown and described in detail in Lucas patent 1,813,355 and, therefore, is not herein described or shown in detail. Suffice it to say that the saddle G is provided with downwardly projecting portions immediately adjacent to the other edges of the ways 14, 15 and to which clamp plates 91, 92 are connected. The inner sides of the clamp plates project underneath the outer portions of the ways 14, 15, and are adapted to be clamped thereagainst by actuation of bell crank levers 93, 94. The lower face of the projections on the saddle G to which the clamp plates 91, 92 are connected are undercut along the inner edges, that is, the edges adjacent to the ways 14, 15, thereby providing small flanges along the outer edges of the projections against which the outer edges of the clamp plates engage and pivot under the action of the bell crank levers 93, 94.

The levers 93, 94 each have a vertically extending arm 95 connected to the shaft 90 and a horizontally extending arm 96 projecting underneath the clamp plates 91, 92. The levers are pivotally or rockably supported on arcuately shaped bearing members carried by studs 97 passing through openings in the arm 96 and through the adjacent clamp plate and having their upper ends threaded into the saddle G. Nuts 98 are threaded onto the lower ends of the studs 97 and engage the underside of the conical bearing members to support the latter on the studs. The outer ends of the arms 96 are provided with upwardly extending projections which engage the undersides of the adjacent clamp plates. When the levers 93, 94 are rocked on their bearing member in a direction to move the free ends of the arm 96 upwardly, the inner edges of the clamp plates 91, 92 are forced in an upwardly direction against the underside of the ways to clamp the saddle to the bed. During the clamping operation the outer edges of the clamp plates tend to pivot about the lower ends of the downwardly extending flanges on the saddle. The levers 93, 94 are rocked in the direction necessary to clamp the saddle to the bed when the shaft 90 is rotated in one direction and the levers are rocked or are freed so that they can rock in the opposite direction to unclamp the saddle when the shaft 90 is rotated in the opposite direction. The right-hand end of the shaft 90 which projects through an opening in the upper end of the front or right-hand bell crank lever is threaded into an hexagonal nut 101 located immediately adjacent to the left-hand or inner side of the vertical arm of the lever. The end of the nut 101 adjacent to the bell crank lever engages within a vertical groove in the adjoining side of the lever so that the nut will not rotate relative to the lever when the shaft 90 is rotated. The rocker washer is interposed between the lever and the adjoining face of the nut 101. A spacer collar 102 interposed between the nut 101 and a projection on the saddle through which the shaft 90 extends limits movement of the nut 101 towards the left as viewed in FIG. 2 thus preventing the nut 101 from becoming disengaged from the groove in the adjoining face of the lever.

When the shaft 90 is rotated in a clockwise direction, as the latter is viewed in FIG. 1, and assuming the threads are right-handed threads, the lever 93 will rock on the bearing member therefor to move the arm 95 outwardly of the machine to raise the inwardly projection of the arm 96 thereof against the adjacent clamp plate 91 and in turn the inner edge of the clamp plate against the underside of the way 14. As the clamp plate is tightened against the bed, the shaft 90 will move axially to the left as viewed in FIG. 2. The axial movement of the shaft 90 to the left causes the arm 95 of the lever 94 on the rear side of the bed to rock in a direction outwardly of the machine to raise the inwardly projecting portion thereof against the clamp plate 92 and in turn the inner edge of the clamp plate against the underside of the way 15. The arm portion 95 of lever 94 has an aperture therein for passing the shaft 90 and collars 99 are secured to the shaft on the opposite sides of the arm portion 95 to cause the arm portion to move with the shaft 90 when the latter moves axially.

As previously indicated air is continuously applied to the motor 62 in such a manner that the motor always rotates or tends to rotate in one direction or the other. With this construction, when the saddle is clamped to the bed the motor stalls and a constant force is applied to the shaft 90 tending to keep the clamp applied. When the direction of the flow of air to the motor 62 is reversed and the shaft 90 is rotated in the opposite direction the force tending to separate the upwardly projecting arm 95 of the bell crank levers 93, 94 is removed and the levers are free to rock or pivot in the direction opposite to that in which they are forced during the clamping operation. It is not necessary to forcibly move the levers in this direction but as the shaft 90 is rotated the nut on the right hand end of the shaft moves to the left along the shaft 90 as viewed in FIGURE 2. Its movement relative to the saddle is limited by the spacing collar immediately to the left of the nut and after it has reached the limit of its movement continued rotation of the shaft 90 moves the left-hand collar 99 towards the right as viewed in FIG. 2 thus pivoting the lever 94 in a clockwise direction until a part thereof engages against a portion of the saddle. When this occurs further movement of the left-hand collar 99 and the shaft 90 towards the right is prevented and the motor 62 again stalled. As the clamps are released the clamp plates 91, 92 do not necessarily disengage the under edges of the saddle ways but the pressure therebetween and the ways is released allowing the saddle to move freely along the bed.

The electric solenoid 64 of the valve 60 may be actuated in any convenient manner. As suggestions, it may be operated by a manually operable on-off eelctric switch or it may be connected with the controls for actuating the movement of the saddle in such a manner that the saddle is unclamped and air applied to the ways therefore upon initiation of movement of the saddle. If actuated in the latter manner it would probably be well to provide a time delay relay in the circuit so that movement of the saddle would not be initiated until after the clamps were released.

With air being supplied to the conduit 55 it will be apparent that upon energization of the operating solenoid 64 of the valve 60 the motor 62 will be actuated to release the saddle clamps and air will be forced into the grooves 43 to 46 and 50 to 53 of the way surfaces 40, 41 to lift the saddle and thus allow its free movement along the bed. As the air passes through the air line lubricator 66 it will pick up oil particles which will be supplied to the saddle ways in the form of a mist. The flow controls will automatically regulate the amount of air admitted to the respective way surfaces 40, 41 so that each surface will receive predetermined amounts of air which amounts are preferably equal, with the result that each end of the saddle will be raised the same predetermined amount. The amount of air admitted to the way surfaces can be regulated by adjusting the needle valves 76, 77. It is, however, preferably maintained as low as possible consistent with other requirements. In some instances it may be preferable to maintain the flow of air to the respective way surfaces small enough that the saddle is not actually lifted from the bed but the air pressure merely relieves part of the weight of the saddle on the bed ways and in this manner assists in the movement of the saddle from one position to another.

In the embodiment of the invention shown the saddle is relatively narrow in comparison with its length and while the pairs of grooves at opposite ends of the way surfaces on the underside of the saddle are non-continuous and located at opposite sides of the center line of the saddle the grooves of each way surface are, however, supplied through a single flow control. The fact that the two way surfaces 40, 41 are supplied by air passing through separate flow controls maintains the saddle level or in a predetermined attitude with respect to the bed regardless of the distribution of the weight or load on the saddle relative to its length. It is, however, to be understood that if greater level control is desired in the direction transverse to the length of the saddle the pairs of grooves in the way surfaces 40, 41 may be supplied by air through flow controls individual to each pair as is the case with the way surfaces 40′, 41′ on the underside of the table F (see FIG. 4) in which the corresponding parts are designated by the same reference characters as those used to designate different parts of the saddle with a prime mark affixed thereto. Since the construction employed in the table and shown in FIG. 4 requires four flow controls, the two extra flow controls have double prime marks applied to their designating reference characters. While no clamp means whatsoever is shown for the table, it is to be understood that a clamp similar to that employed on the saddle is employed on the table and operated in a similar manner to that of the saddle clamp.

The reference characters 110, 111, 110′, 111′ designate conventional oil grooves in the way surfaces 40, 41, 40′, 41'. Oil is supplied to these grooves in the usual manner particularly if oil is not added to the air supplied to the other grooves in the way surfaces.

From the foregoing it will be apparent that the present invention provides a new and improved method of facilitating the movement of a relatively heavy member such as a table or saddle of a combined horizontal boring, drilling and milling machine which comprises introducing between the engaging way surfaces a controlled predetermined constant amount of air distributed in a controlled manner and at the necessary pressure irrespective of variations or differences in back pressure caused by different loads on the movable member to raise the movable member slightly above its support or at least to relieve part of the weight thereof from its support.

The invention may be applied to a rotary table by providing three equally spaced grooves in the way surfaces on the underside of the table connected to a source of fluid pressure by discrete adjustable automatic flow control means.

While the invention has been described in considerable detail it is not limited to the construction shown and it is the intention to cover hereby all adaptations, modifications and changes therein which come within the practice of those skilled in the art to which it relates and the scope of the appended claims.

Having described my invention, I claim:

1. The method of moving a first member supported on a second member by cooperating way surface means at least one of which members has spaced discrete apertures therein adapted to be connected to a source of gaseous fluid under pressure and opening only into the way surface means thereof which comprises supplying gaseous fluid under pressure to a plurality of said spaced apertures in said one member at an automatically maintained predetermined mass flow rate and applying a force to said first member to move the same relative to said second member along said way surface means of said second member.

2. In a machine two relatively movable members one supported on the other by cooperating way surfaces, at least one of said members having a plurality of discrete apertures therein adapted to be connected to separate conduit means and opening only into the way surface of said one member, means for effective relative movement between said members, a source of gaseous fluid under pressure, separate conduit means connected to each of a plurality of said apertures in said one of said members and to said source of gaseous fluid under pressure, and discrete means in each of said conduit means for automatically maintaining a constant volume flow of gaseous fluid to each of a plurality of said apertures.

3. In a machine two relatively movable members one supported on the other by two pairs of cooperating linear way surfaces, one of said members having a plurality of discrete apertures therein adapted to be connected to separate conduit means and opening only into said way surfaces thereof adjacent to but spaced from the ends thereof, means for effecting relative movement between said members such that said apertures opening into said way surfaces of said one member are always covered by the cooperating way surfaces of the other member, a source of gaseous fluid under pressure, separate conduit means connected to each of said apertures and to said source of gaseous fluid under pressure, and discrete automatic compensating flow means in each of said conduit means for maintaining a constant volume flow of gaseous fluid to each of a plurality of said apertures in said one member.

4. In a machine two relatively movable members one supported on the other by two pair of cooperating linear way surfaces, one of said members having a plurality of discrete apertures therein adapted to be connected to separate conduit means and opening only into said way surfaces thereof adjacent to but spaced from the ends thereof, means for effecting relative movement between said members such that said apertures opening into said way surfaces of said one member are always covered by the cooperating way surfaces of the other member, a source of gaseous fluid under pressure, separate conduit means connected to each of said apertures and to said source of gaseous fluid under pressure, and discrete automatic compensating flow means in each of said conduit means for maintaining a constant volume flow of gaseous fluid to each of said apertures in said one member.

5. In a machine a first member, a second member, cooperating way means on said members supporting said second member on said first member for movement between two predetermined positions, means for selectively clamping said members against movement relative to one another, one of said members having a plurality of discrete apertures therein adapted to be connected to conduit means and opening only into said way means thereof, means for effecting relative movement between said members such that said apertures opening into said way means of said one member is always covered by the cooperating way means of the other member, a source of gaseous fluid under pressure, separate conduit means connected to each of said apertures and to said source of gaseous fluid under pressure, valve means in said conduit means for controlling the flow of gaseous fluid to said apertures, discrete automatic compensating flow means in each of said conduit means for maintaining a constant volume flow of gaseous fluid to each of a plurality of said apertures in said one member, means for actuating said first named means to selectively unclamp said members and actuate said valve means to permit the flow of gaseous fluid to said apertures, and means for actuating said valve means to discontinue the flow of gaseous fluid to said apertures and concurrently actuating said first named means to clamp said members against movement relative to one another.

6. In a machine two relatively movable members one supported on the other by two pairs of cooperating linear way surfaces, one of said members having a plurality of discrete apertures therein adapted to be connected to conduit means and opening only into said way surfaces thereof adjacent to but spaced from the ends thereof, means for effecting relative movement between said members such that said apertures opening into said way surfaces of said one member are always covered by the cooperating way surfaces of the other member, a source of gaseous fluid under pressure, separate conduit means connected to each of said apertures and to said source of gaseous fluid pressure, valve means in said conduit means for controlling the flow of gaseous fluid to said apertures, discrete automatic compensating flow means in each of said conduit means for maintaining a constant volume flow of fluid to each of said apertures in said one member, means for selectively clamping said members together, power actuated means for operating said clamping means, and control means selectively operable for causing operation of said clamping means to unclamp said members and actuation of said valve means to permit the flow of gaseous fluid to said apertures and for causing actuation of said valve means to discontinue the flow of gaseous fluid to said apertures and causing operation of said clamping means to clamp said members against movement relative to one another.

7. A machine having a first member and a second member movable relative to said first member, said first and second members being formed with cooperating way surface means for supporting said second member on said first member for movement relative to said first member along a path defined by said way surface means to a predetermined position, one of said members having a plurality of discrete apertures therein opening only into said way surface means thereof and adapted for connection to a source of gaseous fluid under pressure, releasable clamp means for selectively clamping said second member to said first member, a source of gaseous fluid under pressure, and control means operable when said second member is to be moved relative to said first member to said predetermined position, said control means comprising means for releasing said clamp means and connecting said apertures in said one member to said source of fluid under pressure, and means operable when said second member reaches said position to clamp said second member to said first member and to simultaneously disconnect said source of gaseous fluid from said apertures.

8. A machine according to claim 7 having separate conduit means for connecting said source of gaseous fluid to said apertures and including therein discrete automatic compensating flow means in each of said conduit means for maintaining a constant volume flow of gaseous fluid to each of a plurality of said apertures.

9. In a machine two relatively movable members having cooperating way surfaces one of said way surfaces having a plurality of discrete apertures therein, means for effective relative movement between said members, separate conduit means connected to each of said apertures, and separate means in each of said conduit means for supplying a predetermined constant amount of gaseous fluid to each of a plurality of said apertures.

10. In a machine two relatively movable members having cooperating way surfaces one of said way surfaces having a plurality of discrete apertures therein, means for effective relative movement between said members, and means for supplying gaseous fluid to each of a plurality of said apertures at maintained substantially constant mass flow rates.

References Cited by the Examiner
UNITED STATES PATENTS
2,942,385  6/60  Pal _____ 308—9

ANDREW R. JUHASZ, *Primary Examiner*.
WILLIAM W. DYER, JR., *Examiner*.